United States Patent
McMeekin et al.

(10) Patent No.: US 9,787,354 B2
(45) Date of Patent: Oct. 10, 2017

(54) PRE-DISTORTION OF RECEIVE SIGNAL FOR INTERFERENCE MITIGATION IN BROADBAND TRANSCEIVERS

(71) Applicant: FreeWave Technologies, Inc., Boulder, CO (US)

(72) Inventors: Steven E. McMeekin, Evergreen, CO (US); Timothy G. Mester, Longmont, CO (US); Gregory J. Veintimilla, Boulder, CO (US)

(73) Assignee: FreeWave Technologies, Inc., Boulder, CO (US)

( * ) Notice: Subject to any disclaimer, the term of this patent is extended or adjusted under 35 U.S.C. 154(b) by 0 days.

(21) Appl. No.: 14/924,325

(22) Filed: Oct. 27, 2015

(65) Prior Publication Data

US 2016/0127009 A1    May 5, 2016

Related U.S. Application Data (60) Provisional application No. 62/072,277, filed on Oct. 29, 2014.

(51) Int. Cl.

| | | |
|---|---|---|
| H04B 1/44 | (2006.01) | |
| H04B 1/40 | (2015.01) | |
| H04B 17/00 | (2015.01) | |
| H04B 1/00 | (2006.01) | |
| H04B 1/525 | (2015.01) | |
| H04B 1/12 | (2006.01) | |

(52) U.S. Cl.
CPC ............. *H04B 1/525* (2013.01); *H04B 1/123* (2013.01)

(58) Field of Classification Search
CPC ........................................................ H04B 1/48
USPC ............................................................ 455/83
See application file for complete search history.

(56) References Cited

U.S. PATENT DOCUMENTS

| | | | |
|---|---|---|---|
| 5,488,632 A * | 1/1996 | Mason | H04L 27/2602 |
| | | | 348/E7.038 |
| 7,359,311 B1 * | 4/2008 | Paranjpe | H04L 1/20 |
| | | | 370/203 |
| 7,746,896 B2 | 6/2010 | Venkatachalam | |
| 8,509,711 B1 | 8/2013 | Bagley et al. | |
| 8,787,873 B1 * | 7/2014 | Hitt | H04W 8/20 |
| | | | 455/406 |
| 9,117,457 B2 * | 8/2015 | Kwan | G10L 21/0208 |
| 9,628,141 B2 * | 4/2017 | Wyss | H04B 3/23 |
| 2002/0146994 A1 | 10/2002 | Marrah et al. | |
| 2003/0176161 A1 | 9/2003 | Dale et al. | |
| 2003/0210663 A1 | 11/2003 | Everson et al. | |
| 2006/0074558 A1 | 4/2006 | Williamson et al. | |
| 2006/0171335 A1 | 8/2006 | Yuen et al. | |
| 2006/0256884 A1 * | 11/2006 | Tomioka | H04B 1/71637 |
| | | | 375/260 |

(Continued)

*Primary Examiner* — Tilahun B Gesesse (57) ABSTRACT

A broadband transceiver includes an input to receive an RF signal, an output to output an RF transmit signal, a receiver section coupled to the input, and a transmitter section coupled to the output. A processor coupled to the receiver section and the transmitter section determines and generates an inverse waveform that will result in attenuation of undesired portions of a received RF signal when summed with the received signal, including optionally at one or more of an RF stage and an IF stage. A summing junction coupled between the processor and receiver section sums the inverse waveform with the received signal.

29 Claims, 6 Drawing Sheets

(56) References Cited

U.S. PATENT DOCUMENTS

| | | |
|---|---|---|
| 2008/0089443 A1* | 4/2008 | Sanada .............. H04L 27/2675 375/319 |
| 2008/0107079 A1 | 5/2008 | Bae et al. |
| 2009/0040937 A1 | 2/2009 | Xhafa et al. |
| 2009/0225741 A1 | 9/2009 | Wang et al. |
| 2009/0253387 A1 | 10/2009 | van Rensburg et al. |
| 2009/0258665 A1 | 10/2009 | Bourlas et al. |
| 2009/0298522 A1 | 12/2009 | Chaudhri et al. |
| 2009/0303918 A1 | 12/2009 | Ma et al. |
| 2010/0226491 A1* | 9/2010 | Conte ................ G10K 11/1782 379/406.01 |
| 2010/0311452 A1 | 12/2010 | Li et al. |
| 2011/0122831 A1 | 5/2011 | Kim et al. |
| 2012/0184284 A1 | 7/2012 | Moisio et al. |
| 2012/0230453 A1 | 9/2012 | Shih et al. |
| 2013/0003674 A1 | 1/2013 | Lin et al. |
| 2013/0051293 A1 | 2/2013 | Wentink et al. |
| 2013/0102305 A1 | 4/2013 | Liu et al. |
| 2013/0215219 A1 | 8/2013 | Hefeeda et al. |
| 2013/0265915 A1 | 10/2013 | Choi et al. |
| 2014/0119216 A1 | 5/2014 | Patel et al. |
| 2014/0153625 A1 | 6/2014 | Vojcic et al. |
| 2014/0221028 A1 | 8/2014 | Desai et al. |
| 2014/0247800 A1 | 9/2014 | Ro et al. |
| 2014/0254639 A1 | 9/2014 | Tahir et al. |
| 2014/0341133 A1 | 11/2014 | Wang |
| 2015/0092761 A1 | 4/2015 | Kim et al. |
| 2015/0117227 A1 | 4/2015 | Zhang et al. |
| 2015/0124688 A1 | 5/2015 | Xu et al. |
| 2015/0133185 A1 | 5/2015 | Chen et al. |
| 2015/0263816 A1 | 9/2015 | Hinman et al. |
| 2015/0334575 A1 | 11/2015 | Joshi et al. |
| 2015/0381291 A1 | 12/2015 | Mahajan et al. |
| 2016/0126988 A1 | 5/2016 | Mester et al. |
| 2016/0127110 A1 | 5/2016 | McMeekin et al. |
| 2016/0127953 A1 | 5/2016 | McMeekin et al. |
| 2016/0128010 A1 | 5/2016 | McMeekin et al. |
| 2016/0156750 A1 | 6/2016 | Zhang et al. |

\* cited by examiner

PRE-DISTORTION OF RECEIVE SIGNAL FOR INTERFERENCE MITIGATION IN BROADBAND TRANSCEIVERS

CROSS REFERENCE TO RELATED APPLICATION

This application claims the benefit of U.S. Provisional Application Ser. No. 62/072,277 filed on Oct. 29, 2014, entitled Pre-Distortion of Receive Signal For Interference Mitigation In Broadband Transceivers, which is incorporated herein in its entirety and for all purposes.

BACKGROUND

Wireless communication systems are known and commercially available. So-called broadband receivers configured for use over a wide range of frequencies can be configured as superheterodyne receivers using an intermediate frequency (IF) section. In some applications, receivers of these types may be subject to interference from undesired RF signals having frequency content near the frequencies of the desired RF data signals. There is a continuing need for receiver structures and methods of operation that mitigate interference from undesired signals.

SUMMARY

Embodiments of the invention include a broadband transceiver. In embodiments, the transceiver includes an input to receive an RF signal, an output to output an RF transmit signal, a receiver section coupled to the input, and a transmitter section coupled to the output. A processor coupled to the receiver section and the transmitter section determines and generates an inverse waveform that will result in attenuation of undesired portions of a received RF signal when summed with the received signal, including optionally at one or more of an RF stage and an IF stage. A summing junction coupled between the processor and receiver section sums the inverse waveform with the received signal.

DESCRIPTION OF THE INVENTION

Figure 1:
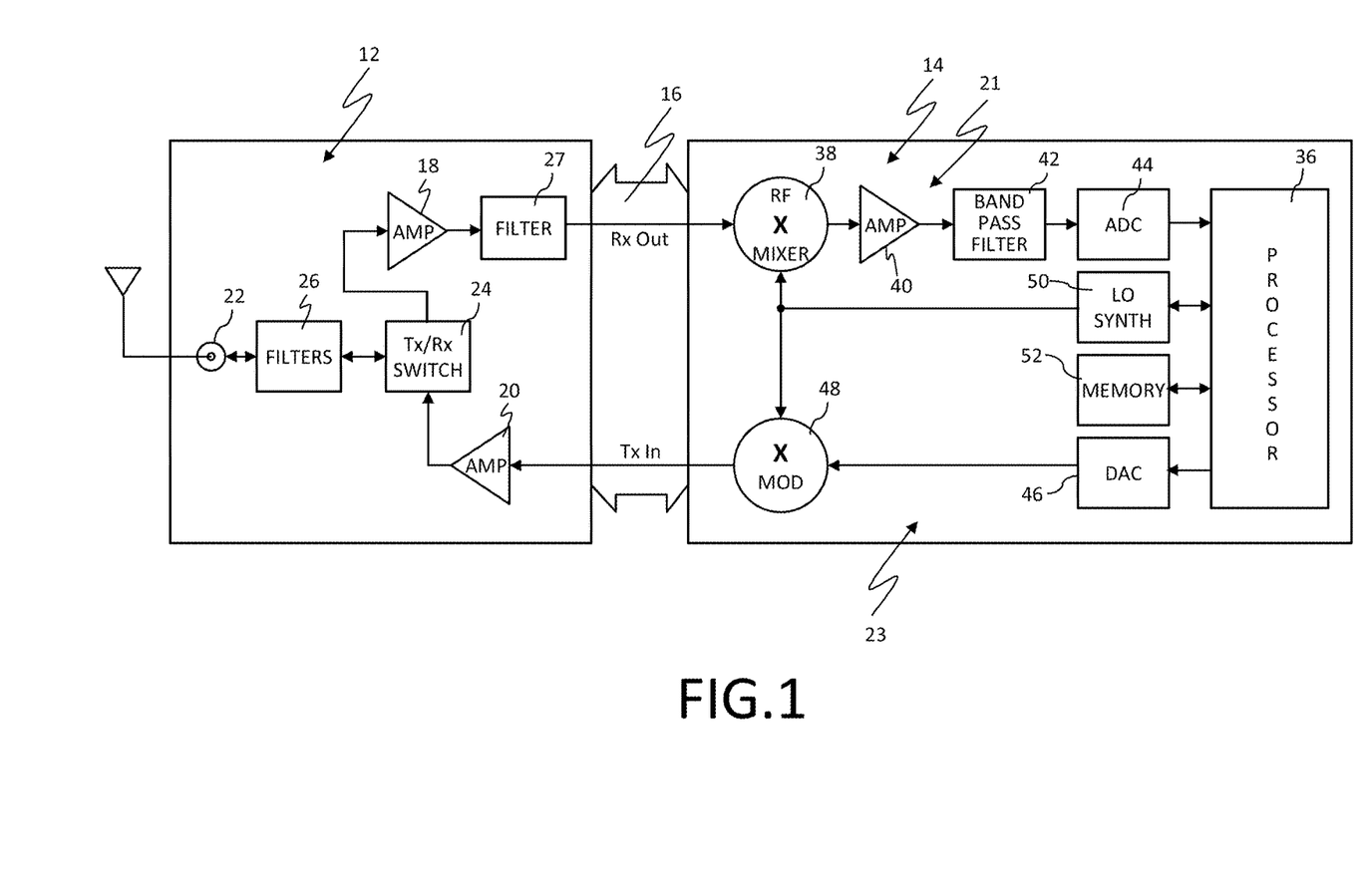
FIG. 1 is a diagrammatic block diagram of a broadband transceiver including an RF front end and modem module in accordance with embodiments of the invention.

FIG. 1 is a diagrammatic illustration of one embodiment of a broad band transceiver 10 that can include receive signal pre-distortion for interference mitigation in accordance with the invention. This particular embodiment of the invention is a time division multiple access (TDMA) broad band transceiver 10. As described in greater detail below, other embodiments of the invention are configured with other channel access methods such as code division multiple access (CDMA) and frequency division multiple access (FDMA).

As shown, the TDMA transceiver 10 includes a radio frequency (RF) front end (RFFE) 12 coupled to modem module (MM) 14 by a connector 16. In embodiments, transceiver 10 operates at one of over a wide range of carrier frequencies such as 100 MHz-6 GHz, and channel bandwidths such as 6.25 KHz-10 MHz. Other embodiments of the invention operate at other frequency bands, other channel bandwidths and/or at multiple carrier frequencies, and can be configured with other physical layers and hardware structures. Wireless communications between transceivers 10 can be organized into sequential frames. Each frame includes a time division duplexed (TDD) downlink portion and an uplink portion that are separated in time by a guard interval. One (e.g., a first) transceiver transmits data during the downlink portions of the frames, and another (e.g., a second) transceiver communicating with the first transceiver by the communication frames transmits data intended for the first transceiver during the uplink portions of the frames. One or more suitable modulation schemes such as, for example, FSK (frequency shift keying) QPSK (quadrature phase shift keying), 16 QAM (quadrature amplitude modulation) and 64 QAM, and multicarrier schemes such OFDM (orthogonal frequency division multiplexing) and OFDMA (orthogonal frequency division multiple access) can be used. In embodiments, the transceiver 10 can dynamically select modulation schemes based on factors such as desired data transmission rates, available channel bandwidth and interference levels. Applications of transceivers 10 include, for example, oil and gas field management, water and wastewater management, location tracking and machine-to-machine (M2M) applications.

The RFFE 12 of the illustrated embodiment is configured for operation at specific carrier frequency bands, and the MM 14 is configured for wide band operation with any of the carrier frequency-specific RFFEs. Accordingly, the RFFE 12 includes band-specific receive (Rx) and transmit (Tx) low noise amplifier 18 and power amplifier 20, respectively, coupled to an antenna terminal 22 through a receive/transmit (Rx/Tx) switch 24. RFFE 12 can also include band-specific filters such as those shown at 26 and 27. Although only the receiver output from (Rx Out) and transmitter input to (Tx In) the RFFE 12 are expressly shown, other signal connections to the RFFE (e.g., a control signal to the receive/transmit switch 24) are coupled between the RFFE and MM 14 by the connector 16.

MM 14 includes a receiver section 21, a transmitter section 23, and processor 36. The receiver section 21 is a superheterodyne receiver and includes an RF mixer 38, an intermediate frequency (IF) stage 39 that includes in the illustrated embodiment intermediate frequency (IF) amplifier 40, and band pass filter 42, and analog-to-digital converter (ADC) 44. Transmitter section 23 includes digital-to-analog converter (DAC) 46 and IQ modulator 48. The RF mixer 38 and modulator 48 are driven by a local oscillator (LO) synthesizer 50 that is coupled to the processor 36 in the illustrated embodiment. Processor 36, which is a digital signal processor (DSP) in embodiments, is coupled to memory 52. Data defining control and signal processing programs and algorithms used by the processor 36, as well as data or other information generated or used by the processor, can be stored in memory 52. RF mixer 38 shifts the carrier frequency of the received RF signal to an intermediate frequency. The received RF signal at the intermediate frequency is then modified or processed by the IF stage including amplifier 40 and band pass filter 42 before applied to the ADC 44. In one embodiment of the invention the intermediate frequency is nominally 140 MHz, and the received RF signals are band pass filtered by a band pass filter 42 having a pass band of about 10 MHz. Other intermediate frequencies and pass bands are used in other embodiments. Processor 36 performs other receive signal processing, transmit signal processing and control functions. For example, the processor 36 performs an IF mixer function to shift the digital received signal from the intermediate frequency to the channel base band, and demodulates those signals. Base band transmit signals produced by the processor 36 are converted to analog form by DAC 46 and modulated onto the carrier by IQ modulator 44. The modulated transmit signals are then outputted to the RFFE 12 for transmission.

Figure 2:
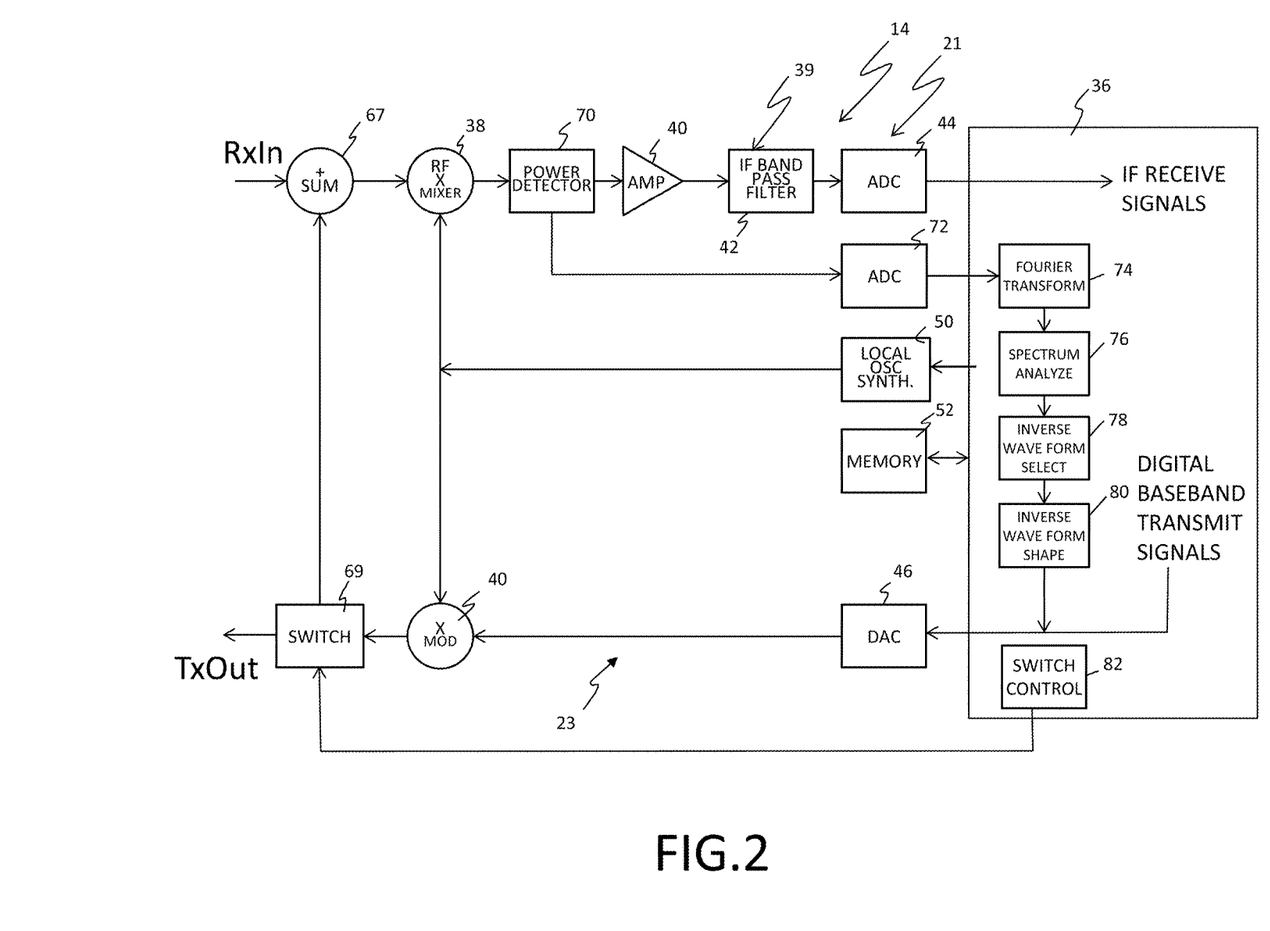
FIG. 2 is a more detailed block diagram of portions of the modem module of FIG. 1 in accordance with embodiments of the invention.

FIG. 2 is a more detailed diagrammatic illustration of a modem module 14, showing additional functional components that cooperate with other components of the modem module 14 and its processor 36 to perform receive signal pre-distortion and interference mitigation in accordance with embodiments of the invention. As shown, the receive signal is inputted to the RF mixer 38 through a summing junction 67 that is controlled by a switch/coupler 69. Summing junction 67 can be implemented in any suitable form, such as, for example, by a directional coupler, hybrid network or summing amplifier. Still other embodiments of the invention (not shown) may not include the switch (e.g., if the summing junction is implemented with a directional coupler or hybrid network). A power detector 70 monitors and provides information representative of the power levels (e.g., RMS levels) of the received signals. In the embodiment shown in FIG. 2, the power detector 70 is an analog device in the receiver section 21, between the RF mixer 38 and amplifier 40, and the monitored power output signal is coupled to the processor 36 through an ADC 72. The power level of the receive signals can be monitored or determined at other locations in other embodiments (not shown). Processing and control functionality of processor 36 includes Fourier transformer 74, spectrum analyzer 76, inverse waveform selector 78 and inverse waveform shaper 80. A switch controller 82 is coupled to the switch 69.

Figure 3:
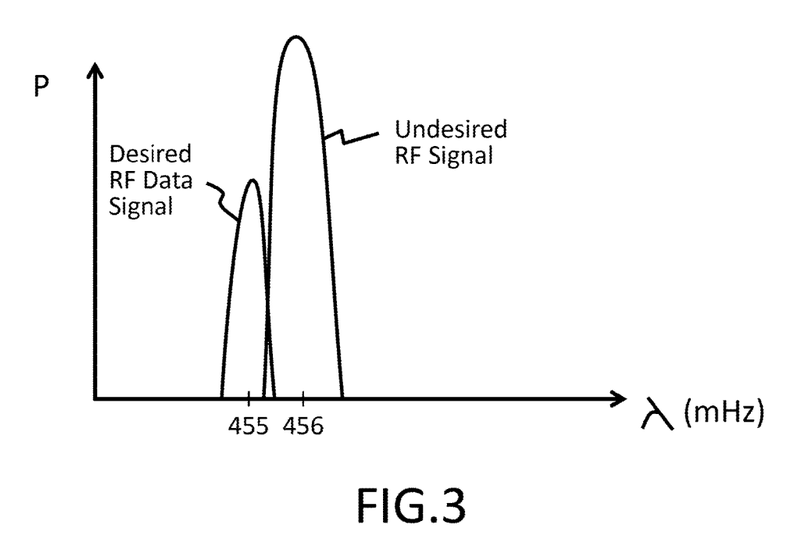
FIG. 3 is a frequency domain graph of an example of RF signals, including a desired RF data portion and an undesired RF signal portion, that may be received and processed by the receiver shown in FIG. 1.

RF signals received and processed by the MM 14 may include RF data signals intended for receipt by the transceiver 10 (the "desired RF data signal"). The desired RF data signal will include data modulated over a channel bandwidth onto a carrier having a carrier frequency. The received RF signals may also include other signals that effectively constitute noise with respect to the desired RF data signals (the "undesired RF signals"). The undesired RF signals received by the transceiver 10 may have frequency or spectral content at or near the channel and/or carrier frequencies of the desired RF data signal. By way of example, FIG. 3 is a diagrammatic frequency domain illustration of the spectral content of a desired RF data signal at about 455 MHz and an undesired RF signal at about 456 MHz. As shown, the desired RF data signal may have a relatively low power level when received by the transceiver 10, since it may have been transmitted by a remote transmitter. The undesired RF signal may have been transmitted by a transmitter located near the transceiver 10, and may have a power level substantially greater than that of the desired RF data signal.

Components of the MM 14, and in particular, components of the receiver section 21, may be sensitive to the power levels of the signals applied to their inputs. For example, it may be advantageous to prevent saturation of the ADC 34 by the input signals. The undesired RF signal, especially if it has relatively high power levels, can therefore interfere with the operation of ADC 34. Similarly, the undesired RF signal can also interfere with the subsequent signal processing operations, including demodulation of the received signal, by the processor 36. Transceiver 10 is configured to operate in a manner that manages or mitigates the effects of the undesired RF signals, and is especially useful at mitigating interference that might be caused by undesired RF signals at or near the frequency of the desired RF data signal. As described in greater detail below, embodiments of the transceiver 10 provide this interference-mitigating function by pre-distorting the received RF signal during time periods that frame portions are being received, including by operating at least portions of the transmitter section 23 (which would otherwise not be operated during time periods that frame portions are being received).

Figure 4:
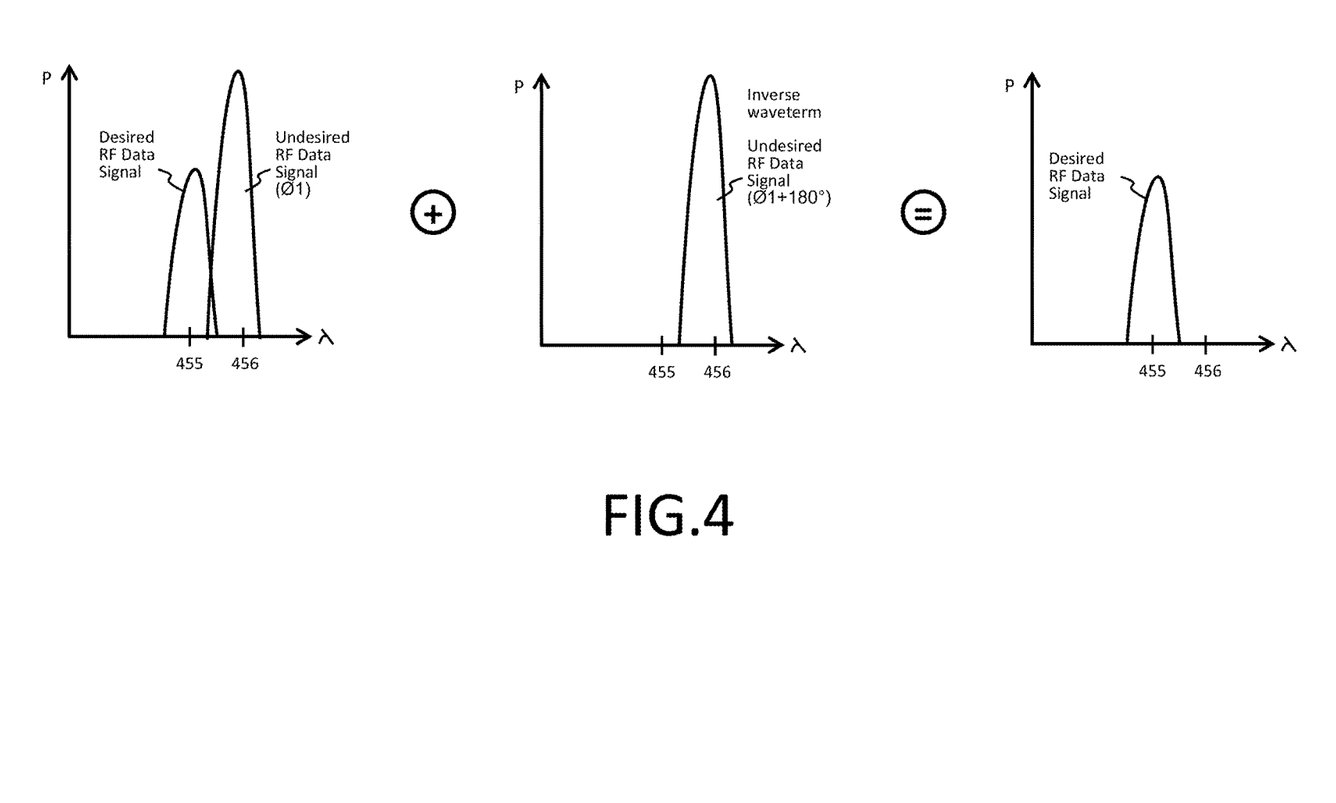
FIG. 4 is a diagrammatic illustration of the pre-distortion interference mitigation methodology performed by embodiments of the invention.

Referring again to FIG. 2, Fourier transformer 74 performs a Fourier transform on the monitored power output signals received from the power detector 70, and generates spectral information such as strength, frequencies, phase and temporal content (i.e., the timing) of the received RF signals. Other embodiments of the invention use other methods such as wavelet transforms to derive the spectral information. Spectrum analyzer 76 analyzes the spectral information produced by the Fourier transformer 74, and identifies the undesired RF signals and optionally the desired RF data signals based on the information from the Fourier transformer. With the knowledge of the spectral information of the undesired RF signals (and optionally the desired RF data signals), inverse waveform selector 78 selects or otherwise determines "inverse" waveforms. The inverse waveforms have spectral characteristics such that when the inverse waveform is summed with the received RF signals (e.g., at the RF stage of the IF stage), it will attenuate or otherwise mitigate interference and/or other detrimental consequences caused by the undesired RF signals (i.e., to preferably substantially eliminate the undesired RF signal). The inverse waveforms selected by the inverse waveform selector 78 can be optimized to maximize the interference-mitigating effects on the undesired RF signals, without substantially detrimentally affecting the desired RF data signals. By way of example, if the identified undesired RF signals include a narrow bandwidth signal surrounding a center frequency, the inverse waveform selector can determine an inverse waveform that has a same or similar amplitude, narrow bandwidth signal at the same or similar frequency, but 180° out of phase with the undesired RF signal. Alternatively, the inverse waveform can have a similar but opposite polarity amplitude, narrow bandwidth signal at the same or approximately the same frequency and phase as the undesired RF signal. In other embodiments, the inverse waveform selector 78 can determine more complex inverse waveforms (e.g, having different amplitudes, phases and/or frequencies) to attenuate more complex undesired RF signals. Inverse waveform shaper 80 then generates and buffers the inverse waveform. When the MM 14 is operating in this interference mitigating mode, the inverse waveform is outputted from the processor 36 through the DAC 46, and switch controller 82 operates the switch 69 to couple the output of modulator 40 to the summing junction 30. The inverse waveform is thereby applied to the summing junction 30 through transmitter section 23, and can mitigate interference by preventing or reducing saturation of the RF mixer 38 (i.e., at the RF stage). FIG. 4 is a diagrammatic illustration of the pre-distortion interference mitigation methodology described above. During the time periods that transceiver 10 is operating to transmit frame portions, the processor 36 will cause the switch 69 to couple the modulated transmit signals from modulator 40 to the output of MM 14 (i.e., and no inverse waveform is generated during these time periods in at least some embodiments).

Figure 5:
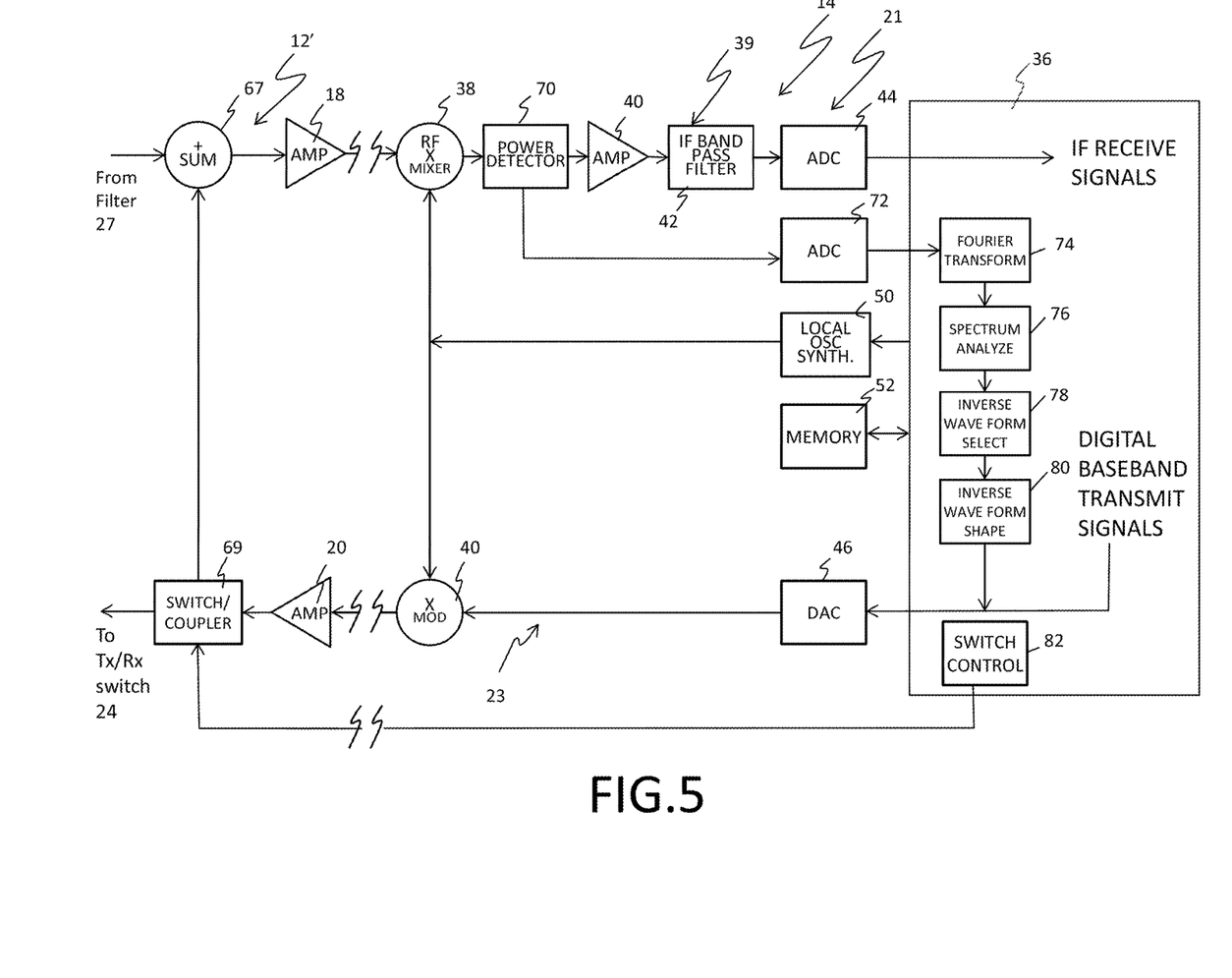
FIG. 5 is a diagrammatic illustration of a broadband transceiver in accordance with alternative embodiments of the invention.
Figure 6:
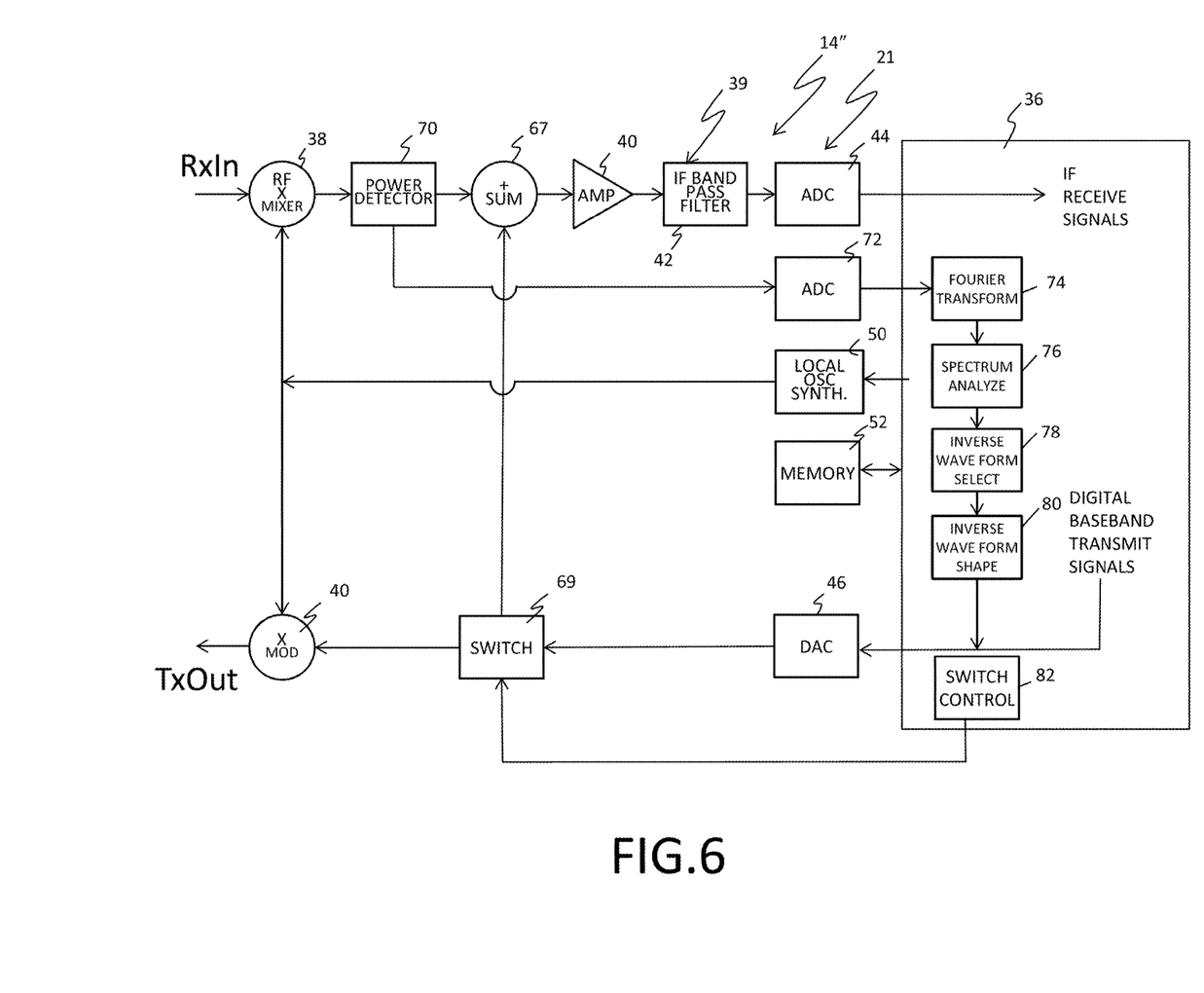
FIG. 6 is a diagrammatic illustration of a modem module in accordance with additional alternative embodiments of the invention.

The invention can be implemented in other embodiments. FIG. 5, for example, illustrates an alternative embodiment including RFFE 12' and MM 14' having the summing junction 67 and switch/coupler 69 located on the RFFE (i.e., also at the RF stage). In this embodiment the summing junction 67 is positioned in the receive signal path before the amplifier 18. The embodiment shown in FIG. 5 can, for example, mitigate interference that might otherwise saturate the amplifier 18. FIG. 6 illustrates another alternative embodiment including an MM 14" having the summing junction 67 positioned in the IF stage 39, between the RF mixer 38 and the amplifier 40. The embodiment shown in FIG. 6 can, for example, generate an IF waveform that cancels undesired signals to prevent or reduce saturation of the ADC and/or other components of the IF stage 39. Yet other embodiments of the invention include FDMA transceivers. In FDMA embodiments, for example, the inverse waveform can be applied to the received signal and remain in the modulated transmit signal. Filters such as those shown at 26 in the RFFE 12 (as shown e.g., in FIG. 1) can attenuate the inverse waveform portion of the signal before it is transmitted from the RFFE. Embodiments of this type may not include certain functionality such as the switch 69 described above in connection with embodiments configured for TDMA.

Although the invention has been described with reference to preferred embodiments, those of skill in the art will recognize that changes can be made in form and detail without departing from the spirit and scope of the invention. By way of non-limiting examples, techniques described herein may be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be embodied by radio technology such as universal terrestrial radio access (UTRA) or CDMA2000. TDMA may be embodied by radio technology such as global system for mobile communications (GSM)/general packet radio service (GPRS)/enhanced data rates for GSM evolution (EDGE). OFDMA may be embodied by radio technology such as IEEE 802.11 (Wi-Fi), IEEE 802.16 (WiMAX), IEEE 802-20, evolved UTRA (E-UTRA), etc.

The invention claimed is:

1. A broadband transceiver, including:
an input to receive an RF signal;
an output to output an RF transmit signal;
a receiver section coupled to the input;
a transmitter section coupled to the output;
a processor coupled to the receiver section and the transmitter section, to determine and generate an inverse waveform that will result in attenuation of undesired portions of a received RF signal when summed with the received signal, wherein the processor includes:
a spectrum analyzer to provide information about spectral characteristics of the received RF signal;
an inverse waveform selector to determine the inverse waveform; and
an inverse waveform shaper for generating the inverse waveform; and
a summing junction coupled between the processor and receiver section, to sum the inverse waveform with the received signal.

2. The transceiver of claim 1 wherein:
the transceiver includes:
an amplifier coupled to the input; and
an RF mixer coupled to receive the RF signal from the amplifier;
the summing junction is located between the input and the amplifier; and
the processor is configured to generate an inverse waveform that will result in attenuation of undesired portions of the received RF signal before the signal is inputted to the amplifier, and to at least reduce saturation of the amplifier.

3. The transceiver of claim 1 wherein:
the transceiver includes:
an RF amplifier coupled to the input; and
an RF mixer coupled to receive the RF signal from the amplifier;
the summing junction is located between the RF amplifier and the RF mixer; and
the processor is configured to generate an inverse waveform that will result in attenuation of undesired portions of the RF signal after the signal is amplified and before the signal is inputted to the RF mixer, and to at least reduce saturation of the RF mixer.

4. The transceiver of claim 1 wherein:
the transceiver includes:
an RF mixer coupled to the input; and
an IF amplifier coupled to an output of the RF mixer;
the summing junction is located between the RF mixer and the IF amplifier; and
the processor is configured to generate an inverse waveform that will result in attenuation of undesired portions of the signal at the intermediate frequency, to at least reduce saturation of the IF amplifier.

5. The transceiver of claim 1 and further including a switch coupled to the processor and the summing junction, for selectively switching the inverse waveform to the summing junction.

6. The transceiver of claim 5 wherein the switch is coupled to the transmitter section and controlled to selectively switch the inverse waveform to either the summing junction or for transmission from the transceiver.

7. The transceiver of claim 5 wherein:
the transmitter includes a modulator; and
the switch is coupled between the processor and the modulator or between the modulator and the output.

8. The transceiver of claim 1 wherein the transceiver is a TDMA transceiver.

9. The transceiver of claim 1 wherein the transceiver is a FDMA transceiver.

10. The transceiver of claim 1 and further including a Fourier transformer coupled to the spectrum analyzer.

11. The transceiver of claim 1 and further including a power detector coupled to the processor.

12. The transceiver of claim 1 wherein the processor causes the inverse waveform to be summed with the received RF signal during receive frame portions.

13. The transceiver of claim 1 wherein the processor causes the inverse waveform to be coupled to the output, and to not generate the inverse waveform, during transmit frame portions.

14. The transceiver of claim 1 wherein the processor generates an inverse waveform having at least portions with a phase that is out of phase, and optionally including about or approximately 180° out of phase, with a phase of the undesired RF signal.

15. The transceiver of claim 1 wherein the processor generates an inverse waveform having at least portions with a power level similar to a power level of the undesired RF signal.

16. The transceiver of claim 1 wherein the processor generates an inverse waveform having frequency components overlapping with frequency components of the desired RF data signal.

17. The transceiver of claim 1 wherein the receiver section includes an IF section.

18. The transceiver of claim 1 wherein the processor identifies desired RF data signal portions of the received RF signal, and determines and generates an inverse waveform to mitigate interference of the undesired portions of the RF signal with the desired RF data signal portions.

19. A method for operating a broadband transceiver, including:
   determining undesired portions of a received RF signal;
   generating an inverse waveform that, when summed with the received signal, will attenuate the undesired portions of the received RF signal, wherein generating the inverse waveform includes:
      spectrum analyzing the received signals, and determining the undesired portions based on the spectrum analysis;
      selecting the inverse waveform; and
      shaping the inverse waveform; and
   summing the inverse waveform with the received signal.

20. The method of claim 19 for a superheterodyne receiver, wherein summing the inverse waveform includes summing the inverse waveform at an IF stage.

21. The method of claim 19 for a superheterodyne receiver, wherein summing the inverse waveform includes summing the inverse waveform at an RF stage.

22. The method of claim 21 including summing the inverse waveform with the RF signal before the RF signal is amplified.

23. The method of claim 21 including summing the inverse waveform with the RF signal after the RF signal is amplified.

24. The method of claim 19 wherein the inverse waveform is summed with the signal during receive frame portions.

25. The method of claim 19 wherein an inverse waveform is not summed with the signal during transmit frame portions.

26. The method of claim 19 wherein:
   the method further includes identifying desired RF data signal portions of the received RF signal; and
   generating an inverse waveform includes generating an inverse waveform to mitigate interference of the undesired portions of the received RF signal with the desired RF data signal portions.

27. The method of claim 19 wherein generating an inverse waveform includes generating an inverse waveform having at least portions with a phase that is out of phase, and optionally including about or approximately 180° out of phase, with a phase of the undesired RF signal.

28. The method of claim 19 wherein generating an inverse waveform includes generating an inverse waveform having at least portions with a power level similar to a power level of the undesired RF signal.

29. The method of claim 19 wherein generating an inverse waveform includes generating an inverse waveform having frequency components overlapping with frequency components of a desired RF data signal.

* * * * *